United States Patent [19]

Hayashi

[11] Patent Number: 5,455,813

[45] Date of Patent: Oct. 3, 1995

[54] DIGITAL SIGNAL REPRODUCING APPARATUS

[75] Inventor: Hideki Hayashi, Tsurugashima, Japan

[73] Assignee: Pioneer Electronic Corporation, Tokyo, Japan

[21] Appl. No.: 148,900

[22] Filed: Nov. 5, 1993

[30] Foreign Application Priority Data

Nov. 6, 1992 [JP] Japan .................................. 4-297218
Feb. 25, 1993 [JP] Japan .................................. 5-036474

[51] Int. Cl.⁶ .................................................. G11B 7/00
[52] U.S. Cl. .............................. 369/59; 360/51; 369/54; 369/124
[58] Field of Search ........................ 360/51, 32, 46; 369/54, 59, 124

[56] References Cited

U.S. PATENT DOCUMENTS 4,566,091  1/1986  Gerard et al. .................... 369/59 X

*Primary Examiner*—W. R. Young
*Attorney, Agent, or Firm*—Sughrue, Mion, Zinn, Macpeak & Seas

[57] ABSTRACT

A digital signal reproducing apparatus reproduces a digital signal with a sampling clock of a high precision that is synchronized with a phase of a read signal. A predetermined sample value series are detected from the sampling data obtained by A/D converting the read signal. Then the mean value of the sample values in the sample value series is obtained. The apparatus produces a sampling clock which is phase corrected on the basis of the mean value.

5 Claims, 5 Drawing Sheets

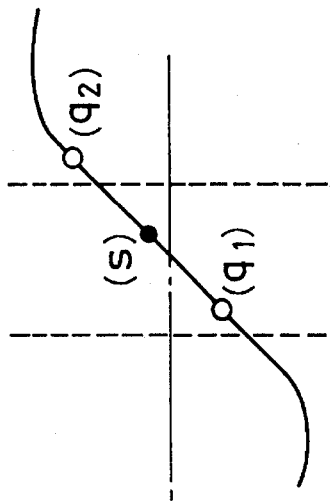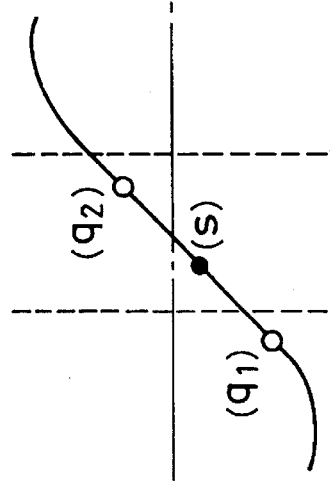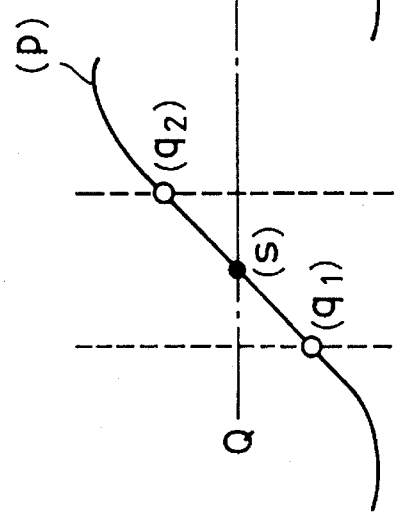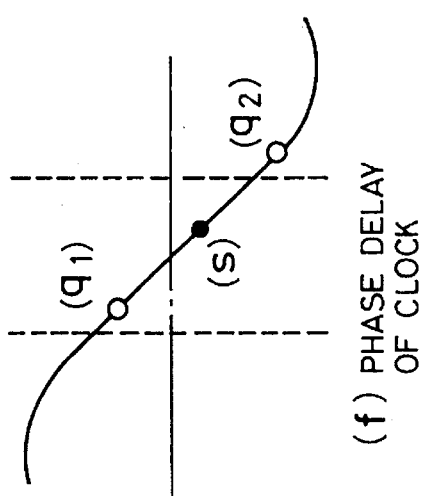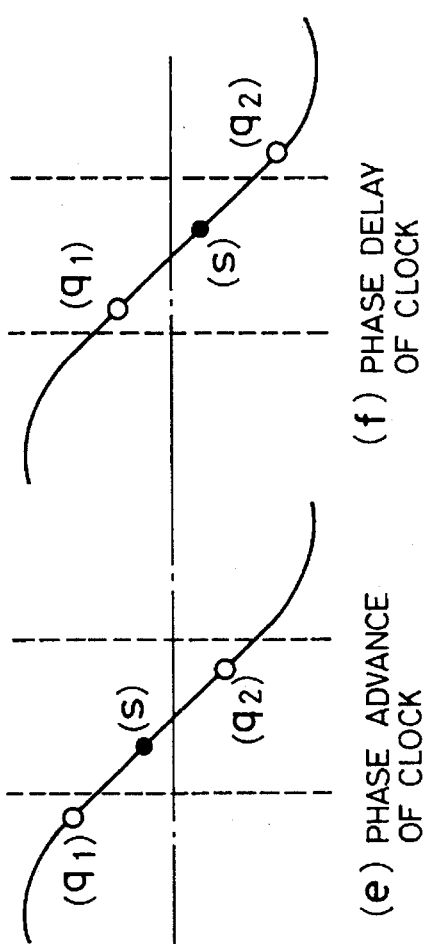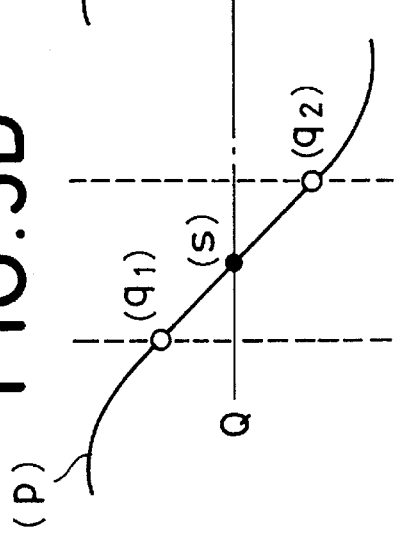

DIGITAL SIGNAL REPRODUCING APPARATUS

BACKGROUND OF THE INVENTION

1. Field of the Invention

The invention relates to an apparatus for reproducing a digital signal recorded on a recording medium.

2. Description of Background Information

With the trend of increase in capacity of recording information, high density recording of information is being pursued. When reproducing recorded information from a recording medium on which the information is recorded at a high density as mentioned above, the reproduction signal obtained will be a signal largely affected by waveform interferences. Thus, an error ratio will be significantly increased when the reproduction signal is decoded. In view of the problem mentioned above, there has been proposed a method in which a Viterbi decoding is performed to the reproduction signal with waveform interferences as mentioned above, and the error ratio of the signal being decoded is reduced.

FIG. 1 shows a digital signal reproducing apparatus using such a Viterbi decoder.

In the diagram, a read signal which is read out by a pickup (not shown) from a recording medium on which recording information has been recorded at a high density is supplied to equalizers 1 and 2, respectively. The equalizer 1 amplifies the supplied read signal in accordance with the equalizing characteristics suitable for a clock signal and eliminates noises and supplies the resultant signal to a pulse forming circuit 3. The pulse forming circuit 3 compares the supplied signal and a reference voltage and forms a pulse and supplies the resultant pulse signal to a clock generating circuit 4. The clock generating circuit 4 generates a clock signal whose phase is synchronized with the supplied pulse signal and supplies the clock signal to an A/D converter 5 as a sampling clock signal. The equalizer 2 amplifies the supplied read signal by the equalizing characteristics suitable for the data discrimination and eliminates noises and supplies the resultant signal to the A/D converter 5. The A/D converter 5 is operative to sample the signal supplied from the equalizer 2 and convert the sampled signal into the digital signal at timings of the supplied sampling clock signal, and to supply the resultant sample values to a Viterbi decoder 6. The Viterbi decoder 6 observes the supplied sample values as a series and decodes and generates a decoding data series having the highest existence probability for the input sample value series.

According to the conventional digital signal reproducing apparatus as mentioned above, the equalizers for waveform equalization are necessary only for the data signal system and the clock signal forming system, respectively.

The delay time of the clock signal forming system which is constituted by the equalizer 1, pulse forming circuit 3, and clock generating circuit 4 is not always equal to the delay time of the equalizer 2 as a data signal system. In order to accurately obtain the sampling clock signal synchronized with the phase of the read signal, accordingly, it is necessary to use a delay adjusting circuit to make the delay times of the data signal system and the clock signal forming system equal to each other. However, if the delay time of each circuit changes due to a factor such as temperature change or the like, since the delay adjusting circuit as mentioned above cannot cope with the delay adjustment, there will be a problem that the sampling clock signal synchronized with the phase of the read signal cannot be obtained.

OBJECT AND SUMMARY OF THE INVENTION

The invention has been made to solve the problem discussed above, and it is an object of the invention to provide a digital signal reproducing apparatus which can reproduce a digital signal by a sampling clock of a high precision which is synchronized with the phase of a read signal.

According to the invention, there is provided a digital signal reproducing apparatus for reproducing a digital signal from a read signal which is read out from a recording medium on which the digital signal was recorded, wherein the reproducing apparatus comprises: an A/D converter for sequentially sampling the read signal by sampling clocks and obtaining a sample value series; detecting means for detecting a predetermined sample value series in the sample value series; mean value calculating means for obtaining the mean value of the sample values of the predetermined sample value series; and clock generating means for generating the sampling clocks whose phases were corrected by the mean value.

A predetermined sample value series is detected from the sampling data obtained by A/D converting the read signal, the mean value of the sample values of the predetermined sample value series is obtained, and the sampling clocks whose phases were corrected on the basis of the mean value are generated.

BRIEF DESCRIPTION OF THE DRAWINGS

FIGS. 5A, 5B, 5C, 5D, 5E, and 5F are diagrams showing the operations in the digital signal reproducing apparatus of the invention;

DETAILED DESCRIPTION OF THE PREFERRED EMBODIMENT

An embodiment of the invention will now be described hereinbelow.

Figure 1:
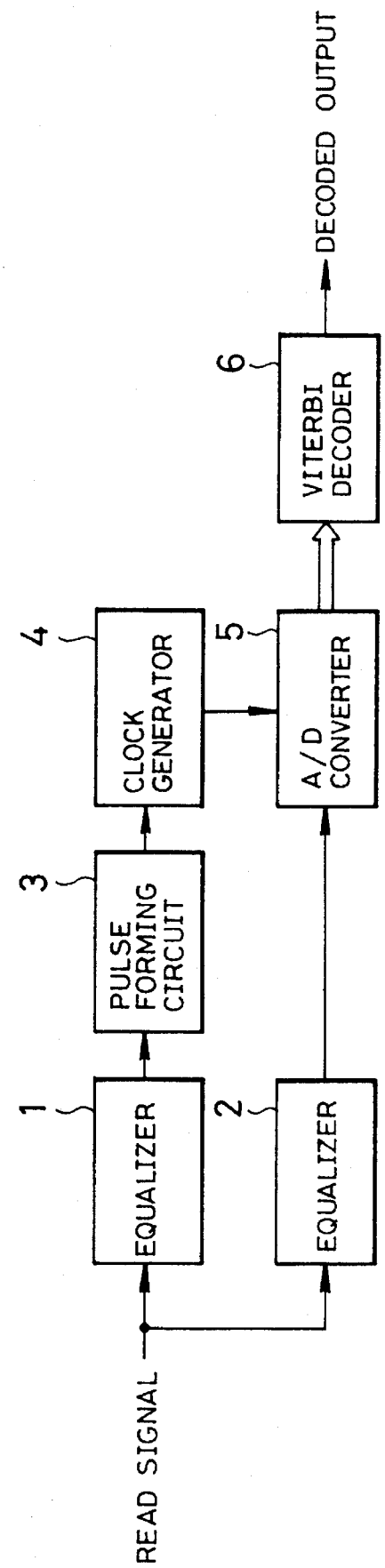
FIG. 1 is a diagram showing the construction of a conventional digital signal reproducing apparatus.
Figure 2:
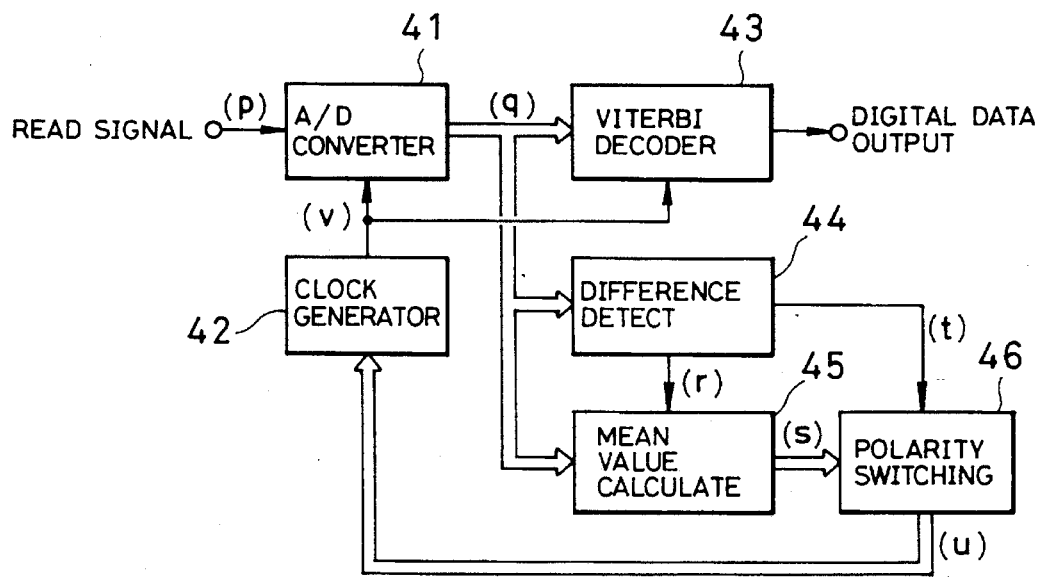
FIG. 2 is a diagram showing the construction of a digital signal reproducing apparatus of the invention.

FIG. 2 shows the construction of the digital signal reproducing apparatus according to the invention.

A read signal (p) which has been equalized in waveform by an equalizing circuit (not shown) is supplied to an A/D converter 41. The A/D converter 41 samples the read signal (p) at a timing of a clock (v) supplied from a clock generating circuit 42 and supplies sample values (q) to a Viterbi decoder 43, a difference detecting circuit 44, and a mean value calculating circuit 45, respectively.

The Viterbi decoder 43 fetches the sample values (q) at the timing of the sampling clock (v) and observes the fetched sample values (q) as a series and decodes and generates a decoding data series having the highest existence probability for the input sample value series. When a relatively large level change of the sample value (q) is detected, the difference detecting circuit 44 supplies a flag (r) of "1" to the mean value calculating circuit 45. When the level change is small, the difference detecting circuit 44 supplies the flag (r) of "0" to the mean value calculating circuit 45. The difference detecting circuit 44 detects a relatively large level change of the sample value (q). In the case where the level change has an ascending tendency, the difference detecting circuit 44 supplies a flag (t) of "1" to a polarity switching circuit 46. Conversely, when the level change has a descending tendency, the difference detecting circuit 44 supplies the flag (t) of "0" to the polarity switching circuit 46. The mean value calculating circuit 45 adds two sample values (q) at a time point when the flag (r) changes from "0" to "1" and at a time point when the flag (r) changes from "1" to "0". Subsequently, the mean value calculating circuit 45 divides the result of the addition into ½, thereby calculating the mean value and supplying as a mean value (s) to the polarity switching circuit 46. When the Flag (t) is set to "1", the polarity switching circuit 46 supplies the signal obtained by subtracting a predetermined level from the mean value (s) to the clock generating circuit 42 as phase difference signal (u). When the flag (t) is set to "0", the signal obtained by inverting the polarity of the signal derived by subtracting a predetermined level from the mean value (s) is supplied to the clock generating circuit 42 as a phase difference signal (u). The clock generating circuit 42 generates the sampling clock (v) on the basis of the phase difference signal (u).

Figure 3:
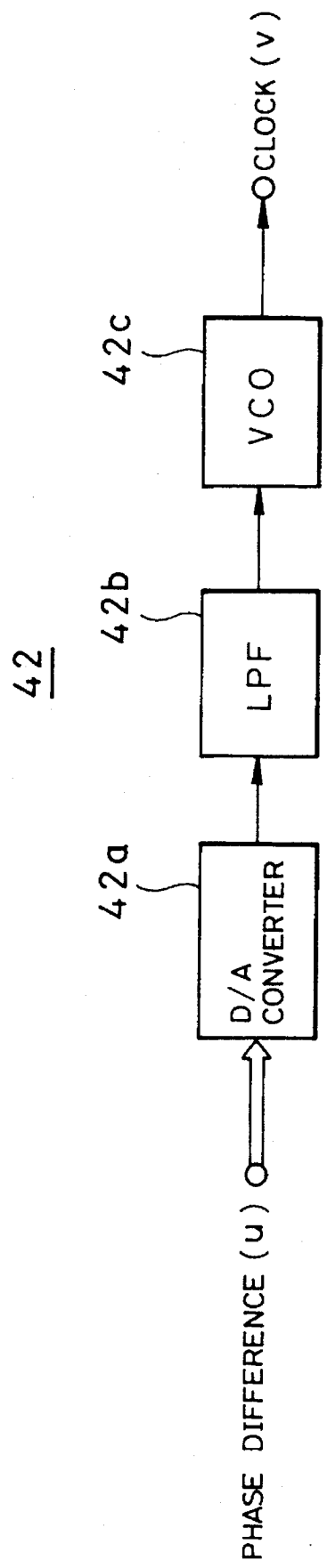
FIG. 3 is a diagram showing the construction of a clock generating circuit in the digital signal reproducing apparatus of the invention.

FIG. 3 shows a construction of the clock generating circuit 42.

A D/A converting circuit 42a converts the phase difference signal (u) supplied from the polarity switching circuit 46 into the analog voltage and supplies it to a low pass filter 42b. The low pass filter 42b averages the supplied analog voltage and sends to a VCO 42c. The VCO 42c generates the sampling clock (v) having an oscillating frequency according to the mean analog voltage supplied from the low pass filter 42b.

With the construction as mentioned above, the clock generating circuit 42 generates the sampling clock (v) which was phase corrected in accordance with the phase difference signal (u).

Figure 4:
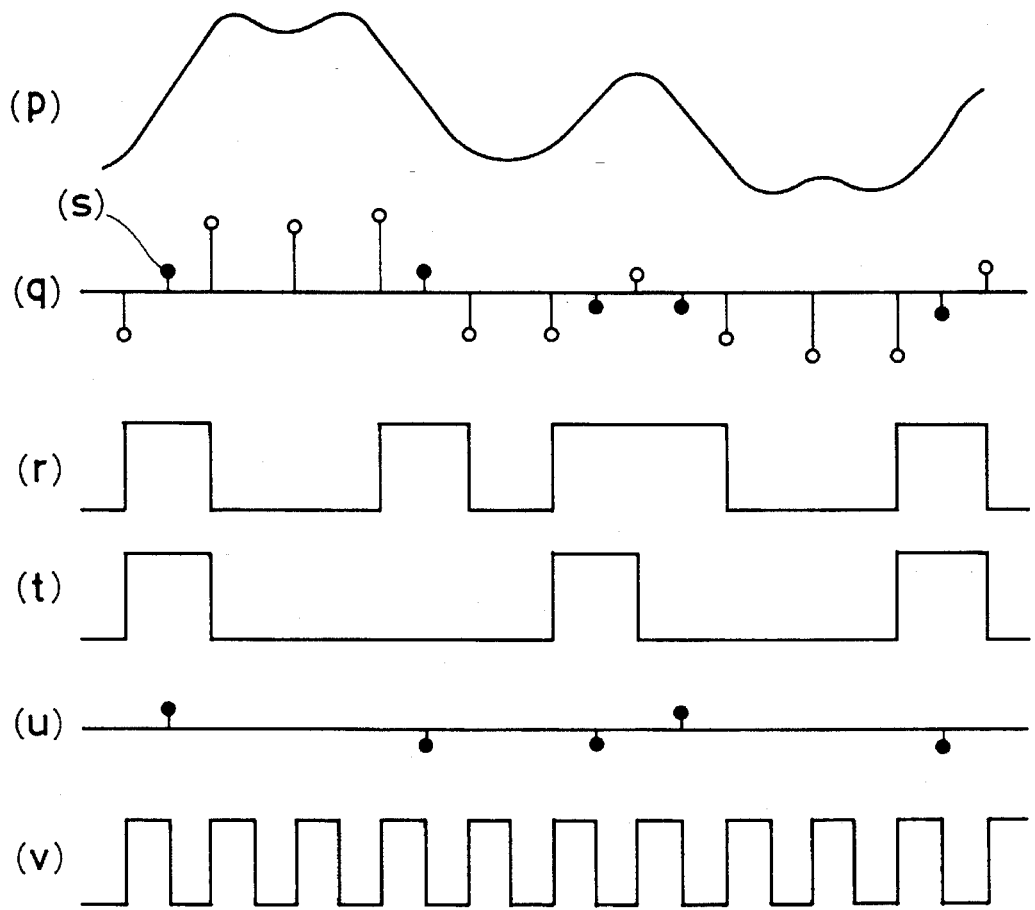
FIG. 4 is a diagram showing the operation in the digital signal reproducing apparatus of the invention.

FIG. 4 is a diagram showing the internal operation of the apparatus shown in FIG. 2.

Reference numeral in the diagram indicates an output signal of each section of the digital signal reproducing apparatus according to the invention shown in FIG. 2. In FIG. 4, the same signals as those shown in FIG. 2 are designated by the same reference characters. In the diagram, a black dot shown in the sample value (q) indicates the mean value (s) as an output of the mean value calculating circuit 45.

FIG. 5 is a diagram for explaining the phase correcting operation of the clock (v) by the digital signal reproducing apparatus according to the invention of FIG. 2. A broken line in the diagram shows the normal, i.e., the desired, sampling timing position for the read signal (p). Conversely, the points designated $q_1$ and $q_2$ show the actual sampling points.

FIG. 5A shows the case where when the level change of the read signal (p) has an ascending tendency, the clock (v) is formed by the normal phase for the read signal (p) and the A/D converter 41 samples by the clock (v) formed by the normal phase and generates sample values ($q_1$ and $q_2$). In FIG. 5A, since the level change of the read signal (p) has an ascending tendency, the difference detecting circuit 44 supplies "1" as a flag (t) to the polarity switching circuit 46. Since the sample values ($q_1$) and ($q_2$) have been sampled at the normal positions, the mean value (s) of the sample values ($q_1$) and ($q_2$) which are generated from the mean value calculating circuit 45 is equal to a predetermined level Q. The polarity switching circuit 46, therefore, supplies:

[mean value (s)]−[predetermined level Q]=0    equation 1 that is, "0" to the clock generating circuit 42 as a phase difference signal (u). In this instance, since the phase difference signal (u) is set to "0", the clock generating circuit 42 generates the clock at the present phase.

FIG. 5B shows the case where when the level change of the read signal (p) has an ascending tendency, the clock (v) is produced at a phase that is advanced for the read signal (p) and the A/D converter 41 samples by the clock (v) of the advanced phase and generates the sample values ($q_1$) and ($q_2$).

In FIG. 5B, since the level change of the read signal (p) has an ascending tendency, the difference detecting circuit 44 supplies "1" as a flag (t) to the polarity switching circuit 46. Since the sample values ($q_1$) and ($q_2$) are sampled at the timings which are earlier than the normal position, the mean value (s) of the sample values ($q_1$) and ($q_2$) which are generated from the mean value calculating circuit 45 has a value smaller than the predetermined level Q. The polarity switching circuit 46, accordingly, supplies:

[mean value (s)]−[predetermined level Q]=−S    equation 2

(S denotes an absolute value of the level difference between the mean value (s) and the predetermined level Q)

that is, "−S" to the clock generating circuit 42 as a phase difference signal (u). In this instance, since the phase difference signal (u) has a minus value, the clock generating circuit 42 generates the clock (v) whose phase is delayed by the time corresponding to "S" than the current phase.

FIG. 5C shows the case where when the level change of the read signal (p) has an ascending tendency, the clock (v) is produced by the phase that is delayed for the read signal (p) and the A/D converter 41 samples by the clock (v) of the delayed phase and generates the sample values ($q_1$) and ($q_2$).

In FIG. 5C, since the level change of the read signal (p) has an ascending tendency, the difference detecting circuit 44 supplies "1" as a flag (t) to the polarity switching circuit 46. Since the sample values ($q_1$) and ($q_2$) are sampled at the timings which are delayed than the normal position, the mean value (s) of the sample values ($q_1$) and ($q_2$) which are generated from the mean value calculating circuit 45 is larger than the predetermined level Q. The polarity switching circuit 46, therefore, supplies:

[mean value (s)]−[predetermined level Q]=S    equation 3

(S denotes the absolute value of the level difference between the mean value (s) and the predetermined level Q)

namely, "S" to the clock generating circuit 42 as a phase difference signal (u). In this instance, since the phase difference signal (u) has a plus value, the clock generating circuit 42 generates the clock (v) whose phase is advanced than the current phase by the phase according to "S".

FIG. 5D shows the case where when the level change of the read signal (p) has a descending tendency, the clock (v) is produced by the normal phase for the read signal (p) and the A/D converter 41 samples by the clock (v) formed by the normal phase and generates the sample values ($q_1$) and ($q_2$).

In FIG. 5D, since the level change of the read signal (p) has a descending tendency, the difference detecting circuit 44 supplies "0" as a flag (t) to the polarity switching circuit 46. Since the sample values ($q_1$) and ($q_2$) are sampled at the normal positions, the mean value (s) of the sample values ($q_1$) and ($q_2$) which are generated from the mean value calculating circuit 45 is equal to the predetermined level Q. The polarity switching circuit 46, therefore, supplies:

$$-\{[\text{mean value }(s)]-[\text{predetermined level }Q]\}=0 \qquad \text{equation 4}$$

namely, "0" to the clock generating circuit 42 as a phase difference signal (u). In this instance, since the phase difference signal (u) is equal to "0", the clock generating circuit 42 generates the clock by the current phase.

FIG. 5E shows the case where when the level change of the read signal (p) has a descending tendency, the clock (v) is produced by the phase that is advanced for the read signal (p) and the A/D converter 41 samples by the clock (v) of the advanced phase and generates the sample values ($q_1$) and ($q_2$).

In FIG. 5E, since the level change of the read signal (p) has a descending tendency, the difference detecting circuit 44 supplies "0" as a flag (t) to the polarity switching circuit 46. Since the sample values ($q_1$) and ($q_2$) are sampled at the timings which are earlier than the normal position, the mean value (s) of the sample values ($q_1$) and ($q_2$) which are generated from the mean value calculating circuit 45 is larger than the predetermined level Q. The polarity switching circuit 46, therefore, supplies:

$$-\{[\text{mean value }(s)]-[\text{predetermined level }Q]\}=-S \qquad \text{equation 5}$$

(S denotes the absolute value of the level difference between the mean value (s) and the predetermined level Q)

namely, "−S" to the clock generating circuit 42 as a phase difference signal (u). In this instance, since the phase difference signal (u) has a minus value, the clock generating circuit 42 generates the clock (v) that is delayed than the current phase by the phase according to "S".

FIG. 5F shows the case where when the level change of the read signal (p) has a descending tendency, the clock (v) is produced at the phase that is delayed for the read signal (p) and the A/D converter 41 samples by the clock (v) of the delayed phase and generates the sample values ($q_1$) and ($q_2$).

In FIG. 5F, since the level change of the read signal (p) has a descending tendency, the difference detecting circuit 44 supplies "0" as a flag (t) to the polarity switching circuit 46. Since the sample values ($q_1$) and ($q_2$) are sampled at the timings which are delayed than the normal position, the mean value (s) of the sample values ($q_1$) and ($q_2$) which are generated from the mean value calculating circuit 45 is smaller than the predetermined level Q. The polarity switching circuit 46, therefore, supplies:

$$-\{[\text{mean value }(s)]-[\text{predetermined level }Q]\}=S \qquad \text{equation 6}$$

(S denotes the absolute value of the level difference between the mean value (s) and the predetermined level Q)

namely, "S" to the clock generating circuit 42 as a phase difference signal (u). In this instance, since the phase difference signal (u) has a plus value, the clock generating circuit 42 generates the clock (v) that is advanced than the current phase by the phase according to "S".

As mentioned above, a relatively large level change of the sampling data derived from the read signal is detected, the mean value is obtained by the sample values before and after the level change at that time, and the phase difference signal is produced by the level difference between the mean value and the predetermined level Q (mean value of the sample values obtained at the normal sampling timings), thereby correcting the phase of the sampling clock.

The mean value calculating circuit 45 in the above embodiment uses only two sample values and obtains an interpolation value by linearly interpolating a portion between them, thereby calculating the mean value. The number of samples, however, which are used does not need to be limited to two samples. It is also possible to use three or more samples and to calculate a symmetrical weighted mean value by executing the weighted addition to those samples. Such an arithmetic operation can be realized by an FIR (Finite Impulse Response) filter.

Figure 6:
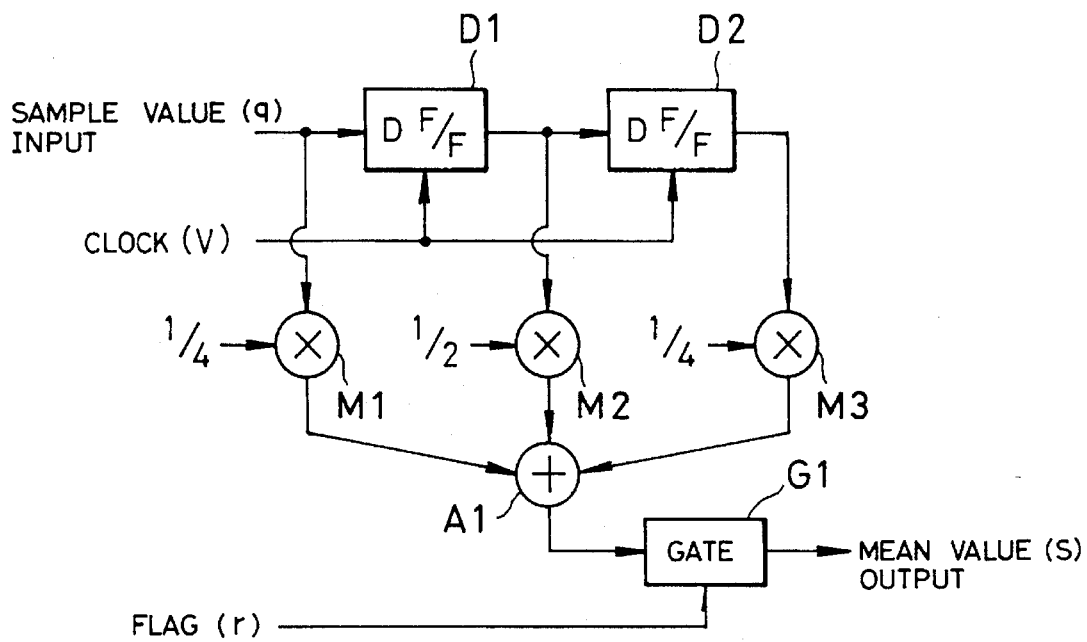
FIG. 6 is a diagram showing an example of a construction of a mean value calculating circuit 45 by an FIR filter.

FIG. 6 shows an example in which the mean value calculating circuit 45 is constructed by such an FIR filter.

In the diagram, the symmetrical weighted mean value is obtained by using three samples and is generated as a mean value (s).

The sample value (q) generated from the A/D converter 41 in FIG. 2 is supplied to a D flip-flop $D_1$ and a multiplier $M_1$, respectively. The D flip-flop $D_1$ fetches the sample value (q) at the timing of the clock (v) which is supplied from the clock generating circuit 42 in FIG. 2 and supplies to a D flip-flop $D_2$ and a multiplier $M_2$, respectively. The D flip-flop $D_2$ fetches the signal supplied from the D flip-flop $D_1$ at the timing of the clock (v) and sends to a multiplier $M_3$. The multiplier $M_1$ supplies the signal obtained by multiplying ¼ to the supplied sample value (q) to an adder $A_1$. The multiplier $M_2$ supplies the signal obtained by multiplying ½ to the signal supplied from the D flip-flop $D_1$ to the adder $A_1$. The multiplier $M_3$ supplies the signal obtained by multiplying ¼ to the signal supplied from the D flip-flop $D_2$ to the adder $A_1$. The adder $A_1$ adds the signals supplied from the multipliers $M_1$ to $M_3$ and supplies an addition signal to a gate circuit $G_1$. The gate circuit $G_1$ passes the addition signal only for a period of time during which the flag (r) is supplied from the difference detecting circuit 44 in FIG. 2 and generates it as a mean value (s).

Figure 7:
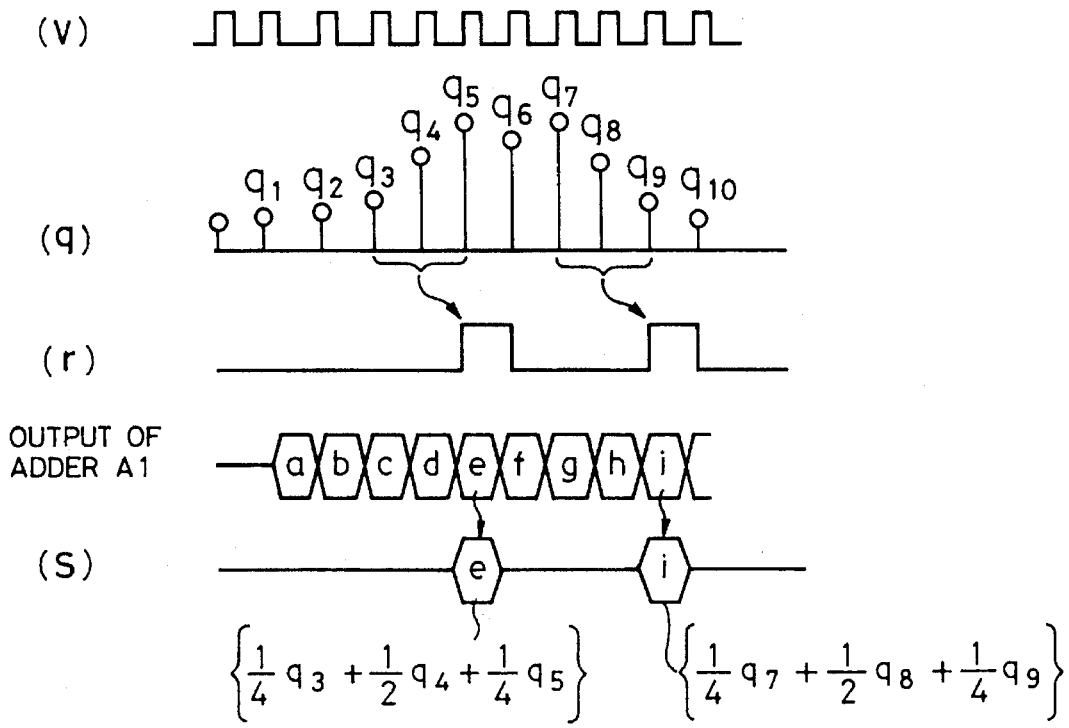
FIG. 7 is a diagram showing the operation of the mean value calculating circuit 45 by the FIR filter.

An example of the operation of the mean value calculating circuit 45 constructed by such an FIR filter will now be described with reference to FIG. 7.

Each of sample values $q_1$ to $q_{10}$ is supplied at the timing of the clock (v) and is sequentially shifted by the D flip-flops $D_1$ and $D_2$ and supplied to the multipliers $M_1$ to $M_3$. The adder $A_1$ adds the signals supplied from the multipliers $M_1$ to $M_3$, respectively, and sequentially generates as shown in a to i.

$$a=(¼)\cdot q_1$$
$$b=(½)\cdot q_1+(¼)\cdot q_2$$
$$c=(¼)\cdot q_1+(½)\cdot q_2+(¼)\cdot q_3$$
$$d=(¼)\cdot q_2+(½)\cdot q_3+(¼)\cdot q_4$$
$$e=(¼)\cdot q_3+(½)\cdot q_4+(¼)\cdot q_5$$
$$f=(¼)\cdot q_4+(½)\cdot q_5+(¼)\cdot q_6$$
$$g=(¼)\cdot q_5+(½)\cdot q_6+(¼)\cdot q_7$$
$$h=(¼)\cdot q_6+(½)\cdot q_7+(¼)\cdot q_8$$
$$i=(¼)\cdot q_7+(½)\cdot q_8+(¼)\cdot q_9 \qquad \text{equation 7}$$

In this instance, when a series having inclinations of the sample values ($q_3$, $q_4$, $q_5$) and ($q_7$, $q_8$, $q_9$) are detected, the difference detecting circuit 44 in FIG. 2 generates the detection flag (r) at the timings of $q_5$ and $q_9$ as final sample values of the series. Only for a period of time during which the flat (r) is supplied, the gate circuit $G_1$ passes the output of the adder $A_1$. In this instance, among the outputs of the adder $A_1$, $$e=(¼)·q_3+(½)·q_4+(¼)·q_5$$

$$i=(¼)·q_7+(½)·q_8+(¼)·q_9 \qquad \text{equation 8}$$

are respectively generated as mean values (s) in accordance with the flag (r).

In FIG. 6, although the construction to obtain the symmetrical weighted mean by using three samples has been shown, the number of samples is not limited to three. It is needless to say that a symmetrical weighted mean can be also obtained by four or more samples.

In the above embodiment, two sample values (q) at a time point when the flag (r) changes from "0" to "1" and at a time point when the flag (r) changes from "1" to "0" are added and the result of the addition is divided into ½, thereby calculating the mean value and supplying the mean value to the polarity switching circuit 46. A similar effect, however, is also obtained even by supplying the result of the addition as it is to the polarity switching circuit 46. In this instance, the predetermined level Q is set to an addition value of the sample values obtained at the normal sampling timings.

In the embodiment, a relatively large level change is detected from the sample value (q) and the flag (r) is produced. In the case where the center level of the read signal (p), however, is equal to 0 [V], a state in which the polarity of the sample value (q) changed from the plus to the minus or from the minus to the plus is detected and the flag (r) can be also produced.

In the above embodiment, further, in the sampling data derived from the read signal, the sample value series having a relatively large level change is detected by the difference detecting circuit 44 and the mean value of the sample values at the time of the detection. It is, however, not always necessary to perform the difference detection as mentioned above.

For example, it is also possible to construct in a manner such that upon recording of information onto the recording medium, a sync pattern having a predetermined repetitive frequency is recorded in addition to recording information and, upon reproduction, the sync pattern is detected and the mean value of the sample value series derived in this instance is obtained. When an RLL code is used, there can be a case where levels near the center level of the read signal that is read out are not flat but have a predetermined inclination. In such a case, therefore, it is possible to adopt an arrangement that no difference is detected and the mean value of the sample value series near the center level of the read signal is obtained.

According to the digital signal reproducing apparatus of the invention as mentioned above, a predetermined sample value series are detected from the sampling data obtained by A/D converting the read signal, the mean value of the sample values of the sample value series is obtained, and the phase corrected sampling clock is generated on the basis of the mean value.

According to the invention, therefore, since the sample clock is produced on the basis of the sample values obtained by A/D converting the read signal, the phase of the sample clock can be corrected so that the sample values have the optimum timings for the data decoding. Further, since the phase of the sampling clock is corrected on the basis of the sample value synchronized with the sampling clock, there is no problem such that the phase accuracy deteriorates as a result that the circuit delay changes due to a temperature change or the like.

What is claimed is:

1. A digital signal reproducing apparatus for reproducing a digital signal from a read signal that is read out from a recording medium on which the digital signal is recorded, comprising:

an A/D converter for sequentially sampling said read signal by a sampling clock and obtaining a sample value series;

a detector for detecting a predetermined sample value series in said sample value series;

a mean value calculating circuit for obtaining a mean value of sample values of said predetermined sample value series; and a clock generator for generating said sampling clock whose phase is corrected by said mean value;

wherein said detector is operative to detect whether a change in level between adjacent sample values of said sample value series exceeds an allowable limit.

2. An apparatus according to claim 1, wherein said detector is operative to detect the sample value series as said predetermined sample value series when a change in level between the adjacent sample values in said sample value series is larger than a predetermined value.

3. An apparatus according to claim 1, wherein said mean value calculating circuit is operative to obtain a symmetrical weighted mean for the sample values of said predetermined sample value series and sets said symmetrical weighted mean to said mean value.

4. The digital signal reproducing apparatus according to claim 2 wherein said mean value calculating circuit is operative to obtain a symmetrical weighted mean for the sample values of said predetermined sample value series and sets said symmetrical weighted mean to said mean value.

5. The digital signal reproducing apparatus according to claim 4, further comprising a polarity switching circuit responsive to said detector to assign a proper polarity to said means value.

\* \* \* \* \*